United States Patent
Adington et al.

(10) Patent No.: US 10,963,827 B2
(45) Date of Patent: *Mar. 30, 2021

(54) SEGMENTED SOCIAL COLLABORATION WITH COMMUNICATION ARBITRATION

(71) Applicant: International Business Machines Corporation, Armonk, NY (US)

(72) Inventors: Lori L. Adington, Raleigh, NC (US); Mary A. Curran, Apex, NC (US); Dana L. Price, Surf City, NC (US); Eduardo Miguel Breijo Baullosa, Morrisville, NC (US); Jonathan Dunne, Dungarvan (IE)

(73) Assignee: International Business Machines Corporation, Armonk, NY (US)

(*) Notice: Subject to any disclaimer, the term of this patent is extended or adjusted under 35 U.S.C. 154(b) by 41 days.

This patent is subject to a terminal disclaimer.

(21) Appl. No.: 16/242,187

(22) Filed: Jan. 8, 2019

(65) Prior Publication Data

US 2020/0219030 A1    Jul. 9, 2020

(51) Int. Cl.
  *G06Q 10/06* (2012.01)
  *G06Q 10/10* (2012.01)
  *G06Q 50/00* (2012.01)

(52) U.S. Cl.
  CPC ... *G06Q 10/06314* (2013.01); *G06Q 10/0633* (2013.01); *G06Q 10/063118* (2013.01); *G06Q 10/107* (2013.01); *G06Q 50/01* (2013.01)

(58) Field of Classification Search
  None
  See application file for complete search history.

(56) References Cited

U.S. PATENT DOCUMENTS

| 8,270,320 B2 | 9/2012 | Boyer et al. |
| 8,503,994 B1 * | 8/2013 | Sanjeev ............ H04M 1/72569 455/414.1 |
| 8,990,310 B1 | 3/2015 | Rochelle et al. |
| 2004/0059622 A1 | 3/2004 | Mueller |

(Continued)

FOREIGN PATENT DOCUMENTS

CN    106170806 A    11/2016

OTHER PUBLICATIONS

Appendix P, "List of IBM Patents or Patent Applications Treated as Related", Mar. 18, 2020, 2 pages.

(Continued)

*Primary Examiner* — Mehmet Yesildag
(74) *Attorney, Agent, or Firm* — Maeve M. Carpenter; Maxine L. Barasch; Keohane & D'Alessandro, PLLC

(57) ABSTRACT

Disclosed embodiments provide a computer-implemented technique for filtering electronic communication based on the current task of a user. The current task of a user is derived using a workflow segmentation model. A workflow segmentation model is derived based on user-defined activities, heuristics, location data, environmental data, and/or other input data. Prior to delivery, electronic communication directed to the user is analyzed based on sender, subject, message content, time of day, and/or other criteria to determine if the message should be presented to the user immediately, or deferred, based on the relevance of the message to the current task of the user.

12 Claims, 12 Drawing Sheets

(56) References Cited

U.S. PATENT DOCUMENTS

| | | | |
|---|---|---|---|
| 2005/0091674 A1* | 4/2005 | Knight | G06F 9/4488 |
| | | | 719/332 |
| 2008/0104052 A1* | 5/2008 | Ryan | G06Q 10/06 |
| 2009/0210494 A1 | 8/2009 | Fisher et al. | |
| 2013/0021176 A1* | 1/2013 | Tu | H04W 4/40 |
| | | | 340/994 |
| 2013/0054706 A1* | 2/2013 | Graham | H04L 51/32 |
| | | | 709/206 |
| 2014/0006972 A1 | 1/2014 | Celkonas | |
| 2015/0006632 A1* | 1/2015 | Tomkins | H04L 51/20 |
| | | | 709/204 |
| 2015/0347191 A1 | 12/2015 | Jamjoom et al. | |
| 2017/0052613 A1* | 2/2017 | Alameh | G06F 3/165 |
| 2017/0333779 A1* | 11/2017 | El Labban | H04L 63/0823 |
| 2018/0013698 A1* | 1/2018 | Vendrow | H04L 67/327 |
| 2019/0306301 A1* | 10/2019 | VanBlon | H04M 1/72563 |

OTHER PUBLICATIONS

Yesildag, Mehmet, U.S. Appl. No. 16/522,770, Office Action dated Jun. 11, 2020, P201805492US02, 23 pgs.

\* cited by examiner

WORKFLOW SEGMENTATION MODEL FOR: LISA

|  | Monday | Tuesday | Wednesday | Thursday | Friday |
|---|---|---|---|---|---|
| 9:00a | Proj. A |  | Proj. A |  | Proj. A |
| 10:00a | Proj. A | Proj. C | Proj. A | Proj. C | Proj. A |
| 11:00a | Proj. A | Proj. C | Proj. A | Proj. C | Proj. A |
| 12:00p |  |  |  |  |  |
| 1:00p | Proj. B | Proj. A | Proj. B | Proj. A | Proj. B |
| 2:00p | Proj. B | Proj. A | Proj. B | Proj. A | Proj. B |
| 3:00p |  |  |  |  |  |
| 4:00p |  |  |  |  |  |
| 5:00p |  |  |  |  |  |

FIG. 3

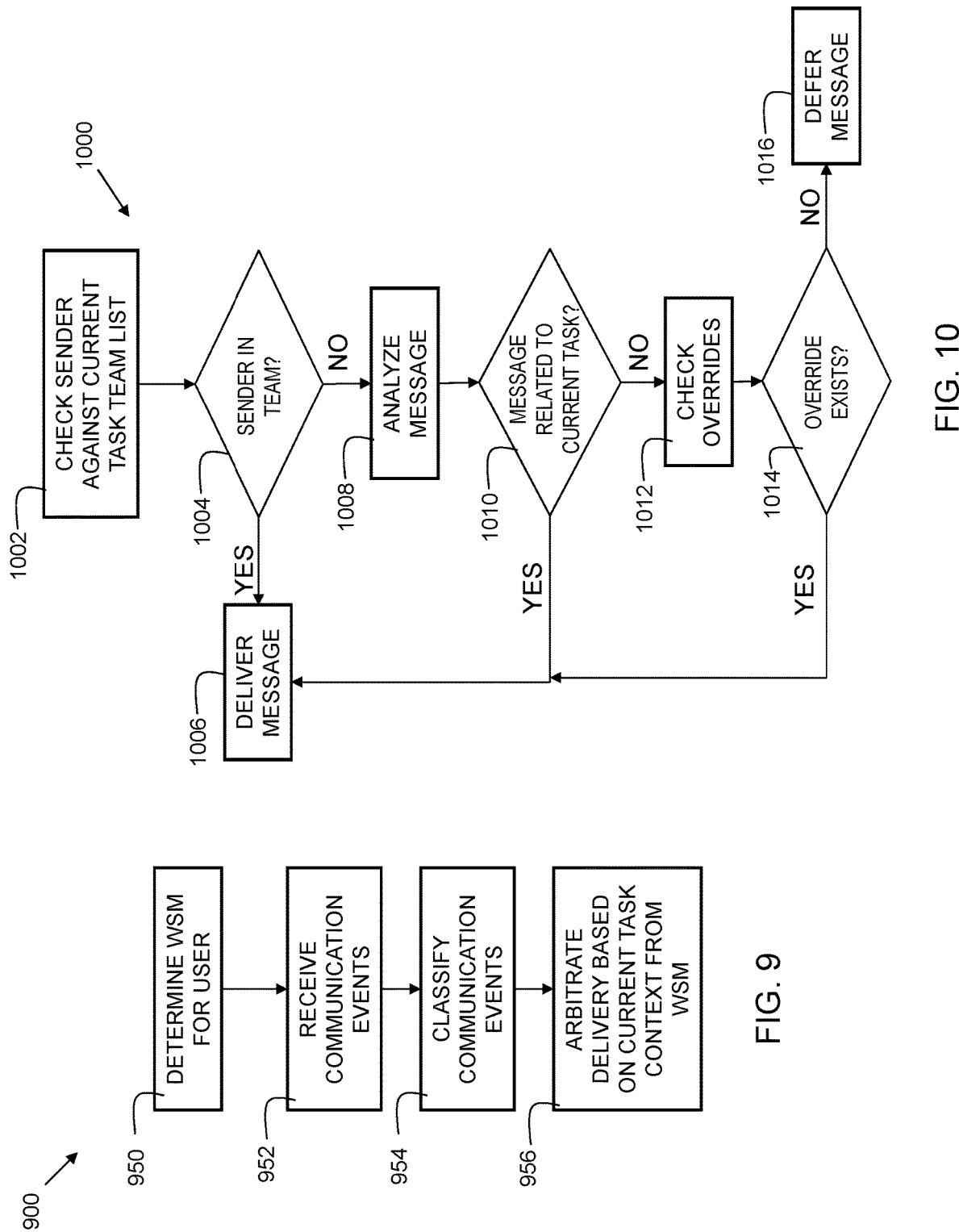

US 10,963,827 B2

SEGMENTED SOCIAL COLLABORATION WITH COMMUNICATION ARBITRATION

FIELD

Embodiments of the present invention relate to electronic communication filtering and, more particularly, to segmented social collaboration with communication arbitration.

BACKGROUND

In the fast-paced environment many people work in today, it can be difficult to manage communications. If a person is working on one project, while receiving messages related to another, this creates a disturbance and causes inefficiency. It is also inefficient for the senders of messages to be unaware of when a co-worker or the like is going to be working on items which relate to the subject matter of the messages. These inefficiencies mean valuable time is lost in terms of full attention to a matter, collaboration opportunities, delayed work product, etc. Accordingly, there exists a need for improvements in electronic communication filtering.

SUMMARY

Embodiments include a computer-implemented method comprising: determining a workflow segmentation model for a user, wherein the workflow segmentation model includes a plurality of task contexts; receiving one or more communication events destined for the user; classifying each of the one or more communication events based on the plurality of task contexts; and arbitrating, based on the workflow segmentation model, the one or more communication events sent to the user, wherein arbitrating includes assigning a correlation value, based on classification of the one or more communication events, and further based on a current task context of the user.

Embodiments further include an electronic computation device comprising: a processor; a memory coupled to the processor, the memory containing instructions, that when executed by the processor, perform the process of: determining a workflow segmentation model for a user, wherein the workflow segmentation model includes a plurality of task contexts; receiving one or more communication events destined for the user; classifying each of the one or more communication events based on the plurality of task contexts; and arbitrating, based on the workflow segmentation model, the one or more communication events sent to the user, wherein arbitrating includes assigning a correlation value, based on classification of the one or more communication events, and further based on a current task context of the user.

Embodiments further include a computer program product for an electronic computation device comprising a computer readable storage medium having program instructions embodied therewith, the program instructions executable by a processor to cause the electronic computation device to perform the process of: determining a workflow segmentation model for a user, wherein the workflow segmentation model includes a plurality of task contexts; receiving one or more communication events destined for the user; classifying each of the one or more communication events based on the plurality of task contexts; and arbitrating, based on the workflow segmentation model, the one or more communication events sent to the user, wherein arbitrating includes assigning a correlation value, based on classification of the one or more communication events, and further based on a current task context of the user.

BRIEF DESCRIPTION OF THE DRAWINGS

Features of the disclosed embodiments will be more readily understood from the following detailed description of the various aspects of the invention taken in conjunction with the accompanying drawings.

FIG. 3 shows an exemplary workflow segmentation model in accordance with embodiments of the present invention.

FIG. 9 is a flowchart indicating process steps for embodiments of the present invention.

FIG. 10 is a flowchart indicating additional process steps for embodiments of the present invention.

Figure 1:
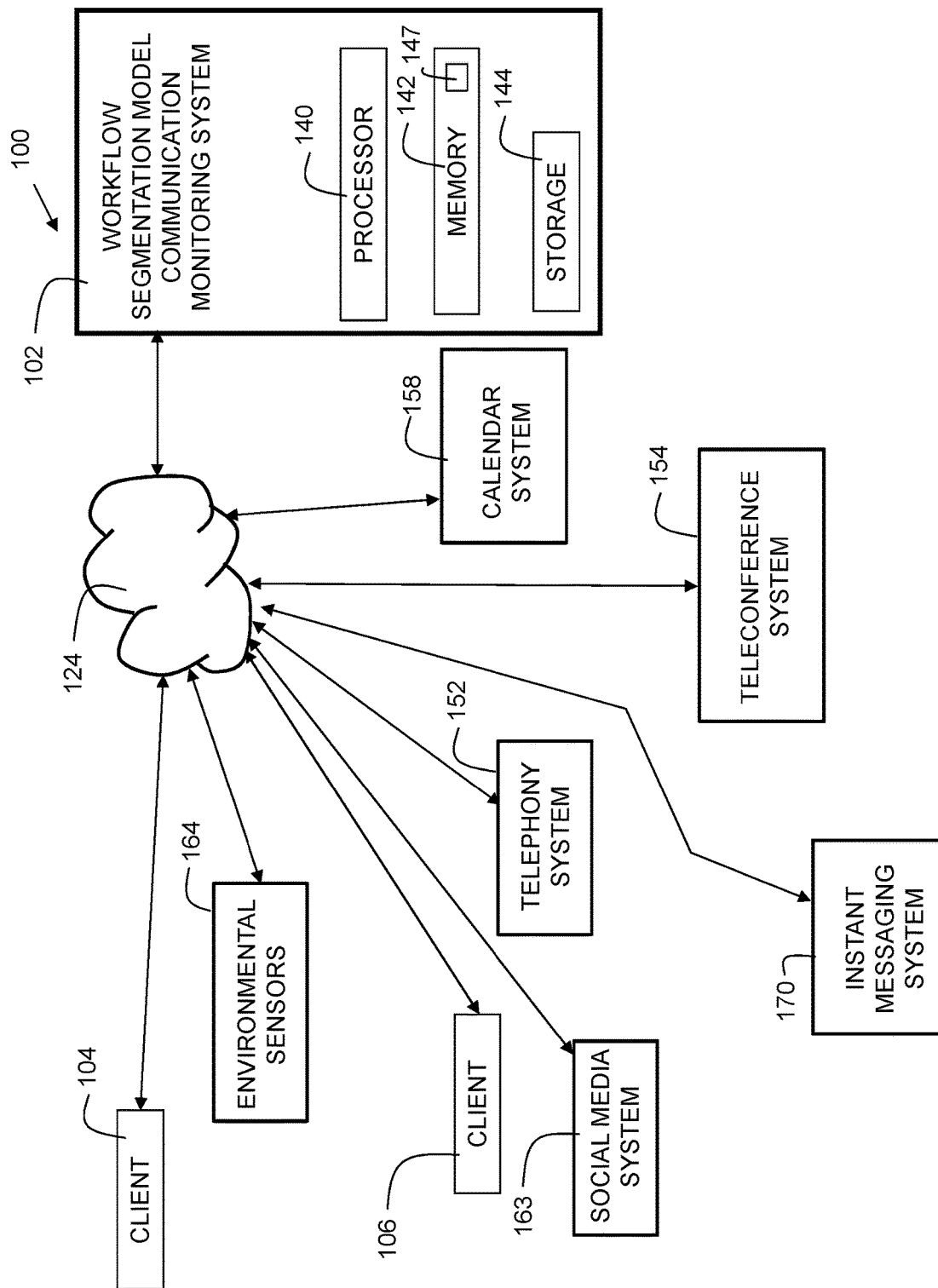
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

A recurring problem in various organizations is that an individual may work within multiple teams or on multiple deliverables. However, teams are typically unaware of parallel schedules. Disclosed embodiments provide techniques that enable the ability of a central schedule management system with an arbitration system that segments social discussion by team, organization, or individual.

Disclosed embodiments provide a computer-implemented technique for filtering electronic communication based on the current task of a user. A workflow segmentation model is derived based on user-defined activities, heuristics, location data, environmental data, and/or other input data. The workflow segmentation model is a data model that describes a current activity (task context) for a user at a given time based on information such as previous activity, location, calendar information, and/or other data.

Embodiments intercept electronic communications directed to the user, and analyze the communications based on sender, subject, message content, time of day, and/or other criteria to determine if the message destined for the user should be presented to the user immediately, or deferred, based on the relevance of the message to the current task of the user.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for embodiments of the present invention. Workflow segmentation model communication monitoring system 102 comprises a processor 140, a memory 142 coupled to the processor 140, and storage 144. System 102 is an electronic computation device. The memory 142, contains instructions 147, that when executed by the processor 140, perform embodiments of the present invention. Memory 142 may include dynamic random access memory (DRAM), static random access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs).

System 102 is connected to network 124, which is the Internet, a wide area network, a local area network, or other suitable network. Telephony system 152 is also connected to the network 124. This system enables the connecting of phone calls. Telephony system 152 can be POTS, PBX, VoIP, or other suitable type.

Calendar system 158 is connected to the network 124. This system allows a user to configure and store items on a calendar/schedule. A user can create entries such as meetings, deadlines, classes, etc. In some embodiments, the calendar system 158 is a computer hosting Microsoft® Outlook®. In some embodiments, determining the workflow segmentation model is based on calendar information of the user. For example, the user may schedule meetings, events, and/or blocks of time pertaining to various projects that he/she is working on. This information may be used as an initial basis for the workflow segmentation model. The workflow segmentation model may then be supplemented based on additional information, including, but not limited to, user location, which client computer systems the user is currently logged into or signed out of, environmental factors such as temperature, and/or other external factors such as a stock market index, sporting event outcome, or the like.

Teleconference system 154 is connected to network 124. This system allows users to conference with one another remotely. In some embodiments, it can be a system such as WebEx®, GoToMeeting®, or another similar type of teleconference system.

Instant messaging system 170 is connected to network 124. This system 170 facilitates instant messaging among client devices. The messaging type may be short message service (SMS), multiple message services (MMS), or software-based systems providing instant messaging, such as messaging on WhatsApp®, Slack®, Skype®, or other suitable platform. The instant messaging system 170 may include any suitable instant messaging system now known or hereafter developed.

Social media system 163 is connected to network 124. This system 163 facilitates electronic connections among user accounts. Users establish accounts in the system and can connect to the accounts of others in the system 163. A user can post and share content to his/her account which appears in the feeds of other accounts in the system. Example systems include Facebook®, LinkedIn®, or Twitter®. Any suitable social networking system now known or hereafter developed is included.

One or more environmental sensors 164 are connected to network 124. Such sensor(s) 164 may be a temperature sensor, a daylight sensor, or a humidity sensor, etc. Any suitable environmental sensor now known or hereafter developed is included.

System 102 may perform a webpage scraping, data feed monitoring, and/or similar functionality to search the Internet, or particular websites, for event information, such as sporting event outcome information or stock market information.

Client devices 104 and 106 are connected to network 124. Client devices 104 and 106 are user computing devices, such as tablet computers, laptop computers, desktop computers, smartphones, PDAs, or other suitable devices that can handle incoming and outgoing voice calls. Although two client devices are shown, in implementations, more or fewer client devices can be in communication with the system shown over the network 124.

Figure 2:
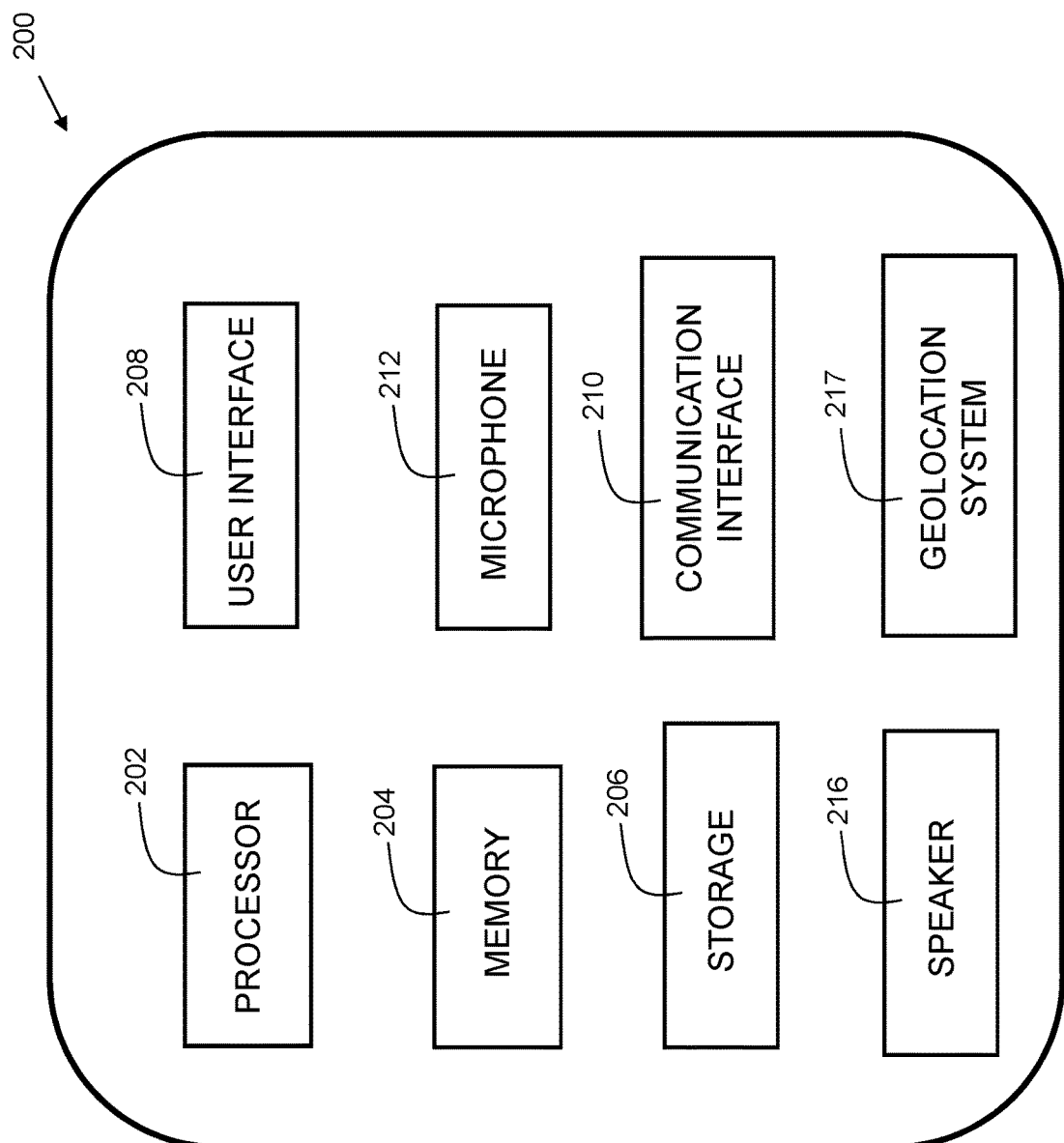
FIG. 2 is a block diagram showing a client device used in embodiments of the present invention.

FIG. 2 is a block diagram of a client device 200 used with embodiments of the present invention. Device 200 is an electronic communication device, representative of client devices 104 and 106 of FIG. 1. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. In embodiments, device 200 may have multiple processors 202, and/or multiple cores per processor. The device 200 may execute an operating system that provides virtual memory management for the device 200. The processor 202 may have one or more cache memories therein.

Device 200 further includes storage 206. In embodiments, storage 206 may include one or more magnetic storage devices such as hard disk drives (HDDs). Storage 206 may additionally include one or more solid state drives (SSDs).

Device 200 further includes a user interface 208, examples of which include a liquid crystal display (LCD), a plasma display, a cathode ray tube (CRT) display, a light emitting diode (LED) display, an organic LED (OLED) display, or other suitable display technology. The user interface 208 may further include a keyboard, mouse, or other suitable human interface device. In some embodiments, user interface 208 may be a touch screen, incorporating a capacitive or resistive touch screen in some embodiments.

Device 200 further includes a communication interface 210. The communication interface 210 may be a wired communication interface that includes Ethernet®, Gigabit Ethernet®, or the like. In embodiments, the communication interface 210 may include a wireless communication interface that includes modulators, demodulators, and antennas for a variety of wireless protocols including, but not limited to, Bluetooth®, Wi-Fi, and/or cellular communication protocols for communication over a computer network.

Device 200 further includes a microphone 212 to enable voice communications. Device 200 yet further includes a speaker 216. Speaker 216 may be powered or passive.

Device 200 further includes geolocation system 217. Geolocation system may be global positioning satellite system (GPS), GLONASS, Galileo, BeiDou, and/or other suitable system.

FIG. 3 shows an exemplary workflow segmentation model (WSM) 300 in accordance with embodiments of the present invention. A "workflow segmentation model" (WSM) is a schedule of what the user does, and when, and which task context it is associated with. Embodiments include determining a workflow segmentation model for a user, wherein the workflow segmentation model includes a plurality of task contexts. A task context is a project, task, or activity performed, attended, or worked on by the user during the course of a work day. A workflow segmentation model is derived based on user-defined activities, location data, environmental data, and/or other input data. The WSM can be derived heuristically, and/or by manual entry from the user.

In the example herein, the WSM 300 has six columns and ten rows. Column 302 shows times of day, which are the titles of the rows, and row 320 shows days of the week, which are the titles of the columns. Rows 322, 324, 326, 328, 330, 332, 334, 336, and 338 each show a time of day from 9 am to 5 pm, at one-hour intervals. Column 304 is Monday, column 306 is Tuesday, column 308 is Wednesday, column 310 is Thursday, and column 312 is Friday. The columns and rows intersect to form cells on the WSM. This is an example of a WSM, and in implementations, more, fewer, or different items may be included thereon.

A WSM corresponds to a user, which in the example is Lisa. Although the WSM in the representation of FIG. 3 looks like a two-dimensional calendar, it is a computer-generated dynamic multidimensional conglomeration which can comprise a multitude of determinations, calculations, identifications, detections, and in some cases, assumptions. For example, the WSM can adapt based on factors such as user location and environmental factors such as temperature. A current time/date is input into the WSM, which outputs a current task context (what the user is currently working on). Thus, in response to intercepting a communication event, embodiments include determining whether to deliver a message (associated with the communication event) to a recipient as soon as possible, or to defer it (i.e., delay or block it), based on the relevance of the message to the current task (or activity) of the user.

In the example, Project A is the task context assigned to the cells in column 304, rows 322-326; column 306, rows 332 and 334; column 308, rows 322-326; column 310, rows 332 and 334; and column 312, rows 322-326. This means that Lisa, the user, is scheduled to work on Project A from 9 am-12 pm on Monday, Wednesday, and Friday, and from 2 pm-4 pm on Tuesday and Thursday.

Project B is the task context assigned to the cells in column 304, rows 330-334; column 308, rows 330-334; and column 312, rows 330 and 332. This means that Lisa is scheduled to work on Project B from 1 pm-4 pm on Monday and Wednesday, and from 1 pm-3 pm on Friday.

Project C is the task context assigned to the cells in column 306, rows 324 and 326 and column 310, rows 324 and 326. This means that Lisa is scheduled to work on Project C on Tuesday and Thursday from 10 am-12 pm.

Figure 4:
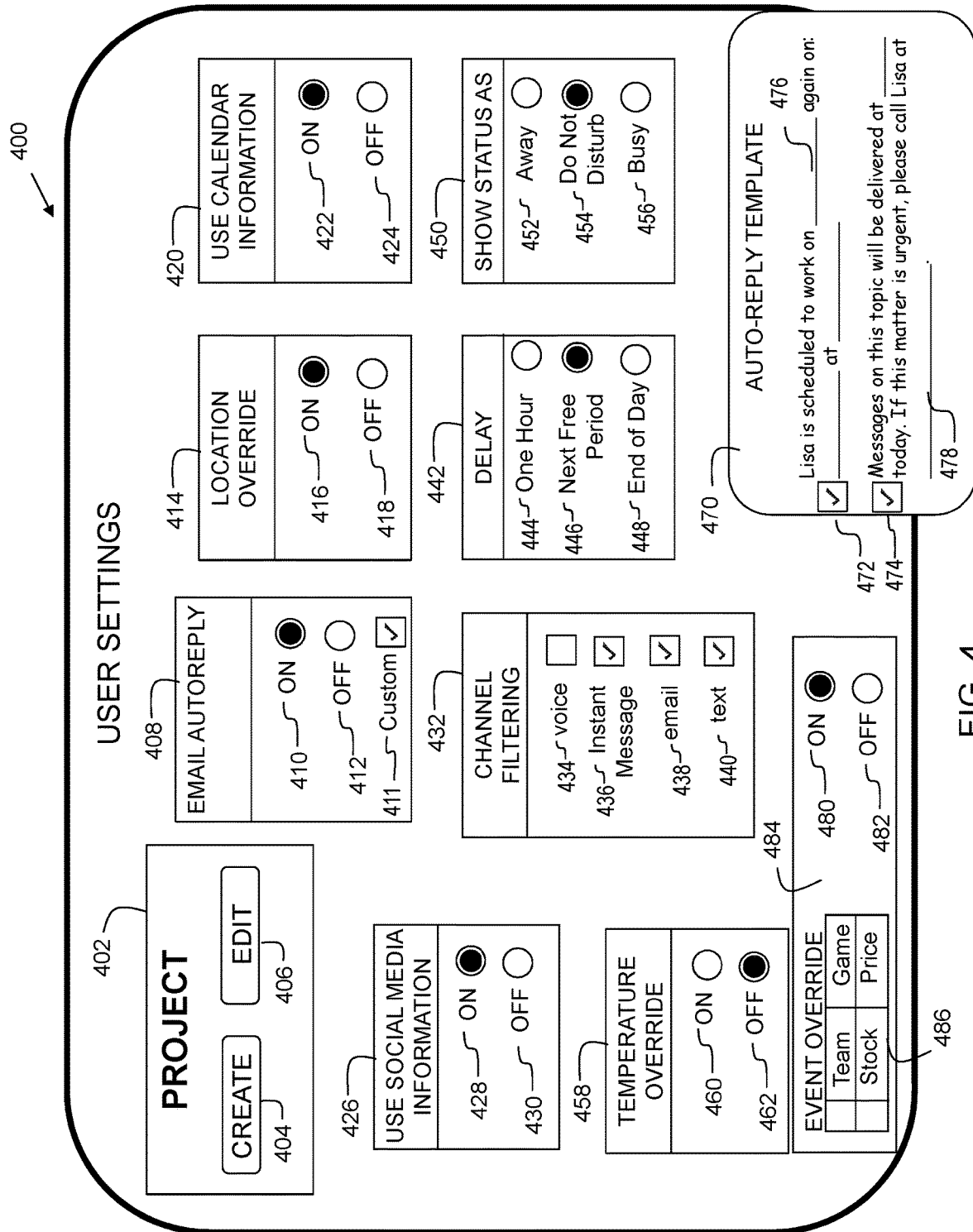
FIG. 4 shows user settings for an embodiment of the present invention.

FIG. 4 shows user settings 400 for an embodiment of the present invention. In some embodiments, determining the WSM further comprises receiving user preferences. The user preferences are received by embodiments through options from which a user can select. The settings are set and stored in association with a corresponding project.

The user preference options shown in FIG. 4 are exemplary, and other feasible controls are included within the scope of the invention. The controls are shown selectable as buttons (which a user presses using a mouse, stylus, or finger), check boxes (where more than one option of a plurality of options can be selected), and radio buttons (where only one option can be selected at a time from a plurality of options). These selection mechanisms are exemplary, and in implementations, the controls can be substituted with any suitable selection mechanism.

At 402, controls are presented from which a user can select to create a new project or edit an existing task context, called a project on the example, at button 404 or button 406, respectively. The term "project" herein is used generically for an activity that a user or group of users is to perform, work on, attend, etc., such as a meeting, appointment, work task, etc.

Figure 6:
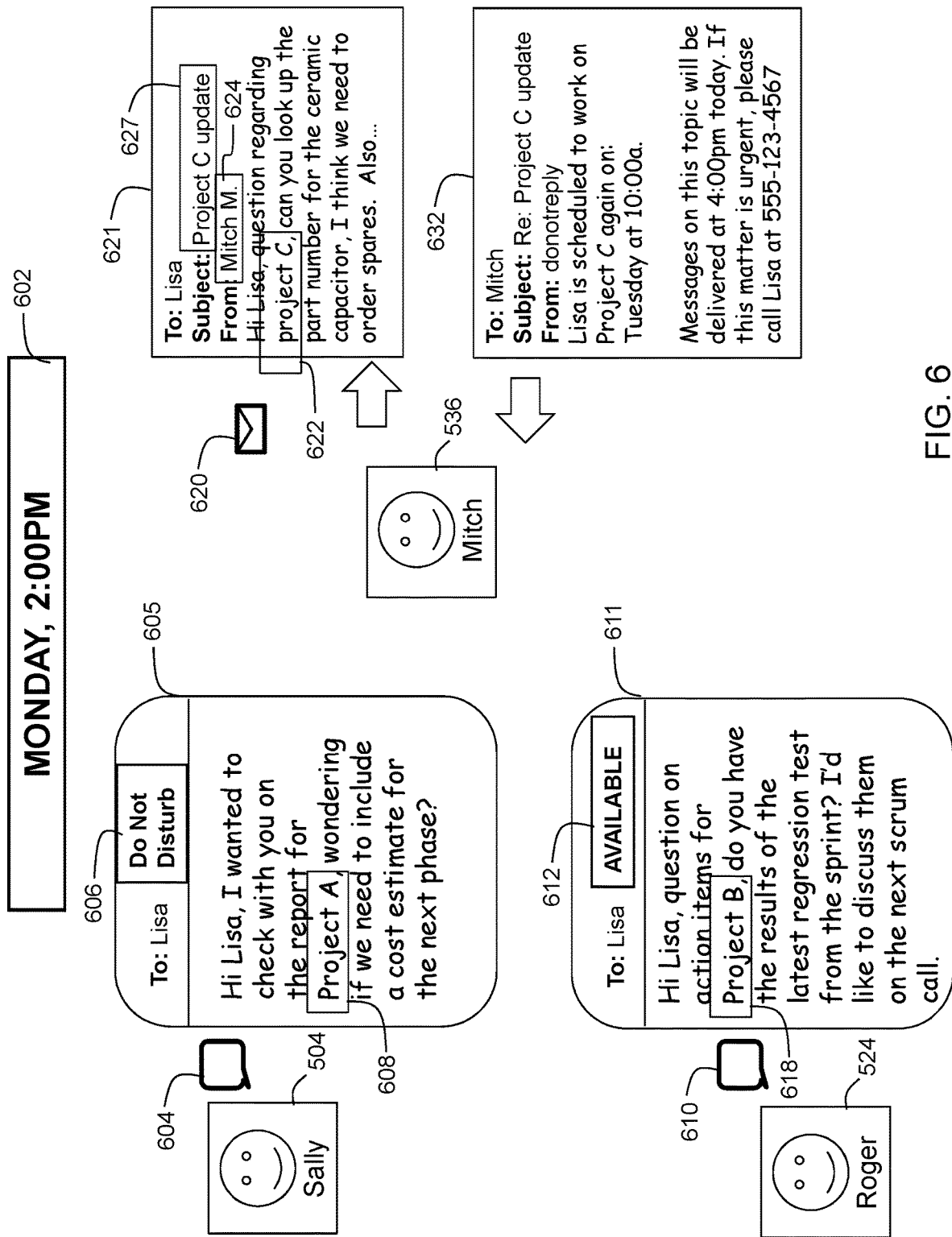
FIG. 6 shows exemplary communication in accordance with embodiments of the present invention.

At 408, controls are presented from which a user can select whether a notification is to be sent (such as an email autoreply, an example of which is shown at 632 in FIG. 6). Radio button 410 is for "on" (send notification), and radio button 412 for "off" (refrain from sending notification). In some embodiments, the notification can include a standard "I'm away" type of message. In some embodiments, when the "on" option is selected, a custom option 411 is made available for the user to customize the autoreply. When such box is checked and the radio button 410 is selected, a pop-up 470 can be displayed. The user can at 472 and 474 select which paragraphs to include, and fill in blank information such as at 476 and 478. In some embodiments, the notification can be completely customizable by a user. The content of the notification is saved for delivery later.

At 420, controls are presented from which a user can set whether calendar information (such as in calendar system 158 of FIG. 1) is to be enabled. The radio button 422 is for "on" and the radio button 424 is for "off." When set to "on" 422, a calendar associated with the user is scraped for meetings, appointments, and other user entries for building the WSM. Such items are added to the WSM in association with their respective durations.

At 426, controls are presented from which a user can set whether social media information (such as in social media system 163 of FIG. 1) is to be enabled. The radio button 428 is for "on" and the radio button 430 is for "off." When set to "on," a social media account associated with the user is scraped for meetings, appointments, and other user entries for building the WSM. Such items are added to the WSM in association with their respective durations.

At 414, controls are presented from which a user can set a location override. In some embodiments, determining the WSM is based on geographical location information of the user. This allows an override to the WSM based on user location as the WSM is dynamic. For example, at 2 pm on Monday, the task context of the user is Project B (see 332 of FIG. 3), but on this particular day, her wearable GPS tracker (or smartphone) detects that she is at a facility associated with Project C. Accordingly, an assumption is made that she is working on Project C at this time. If she had set the override to "on" 416, then embodiments would perform according to the assumption that her task context is Project C at such time, rather than Project B. If she has selected the "off" radio button 418, then the current location would be ignored for the purposes of determining the current task context of the user.

At 458, controls are presented from which the user can set a temperature override (e.g., using environmental sensors 164 of FIG. 1) as again, the WSM is dynamic. The radio button 460 is for "on" and the radio button 462 is for "off." When set to "on", a project or entry on the WSM will be overridden when a preset temperature threshold is reached. As an example, a manager of an airport ground crew may have to switch tasks to supervising deicing activities when the temperature falls below zero degrees Celsius, regardless of what the current task context assigned on the WSM at the time indicates. Thus, if embodiments intercept a message pertaining to deicing, and the temperature is below freezing, then embodiments would perform according to the assumption that s/he is working on deicing at such time, rather than ground crew management. If s/he has selected the "off" radio button 462, then the detection would be ignored.

At 432, controls are presented from which the user can choose which channels to filter. The example options are among types of communication events, such as voice 434, instant messaging (IMing) 436, email 438, and text 440. In the example, the boxes for instant messaging 436, email 438, and text 440 are each checked, and the box for voice 434 is not. This means that any incoming IM, email, or text messages will be filtered by embodiments. Any voice calls will not be filtered, and will be delivered as soon as possible without regard to the current task context of the user according to the WSM.

At 442, controls are presented from which the user can set an "induced communication delay" (ICD). The ICD represents how much time to delay a communication when the task context of the user is not related to (i.e., does not match with) the content of the message. In the example, the options are one hour 444, next free period 446, and end of day 448. Also, in some embodiments, a user can set embodiments to subject certain types of communication to an ICD, such as text, email, IM, but deliver voice calls through without delay. These options are examples, and in implementations, more, fewer, and/or different options may be included. Thus, embodiments include receiving user preferences for a customizable induced communication delay.

At 450, options are presented from which the user can set what status is to be shown to originators/senders of communications which are deferred. In the example, the options include away 452, do not disturb 454, and busy 456. These options are examples, and in implementations, more, fewer, and/or different options may be included. Thus, embodiments can show a different status to different users based on the current work activity (task context) of the recipient. The current task context is based on the WSM of the recipient and reflects what the user is currently doing.

At 484, options are presented from which a user can set an override in response to an event. In some embodiments, a user may set controls such that an override may occur in response to an event. The radio button 480 is for "on" and the radio button 482 is for "off." A set of drop down menus is shown generally at 486 where the user can select a team, game, stock, and/or price.

In some embodiments, the event selected is a particular team winning a particular game. When a particular team wins a game (or in some cases, loses), this triggers an override to the calendar of the WSM. For example, if a particular team wins Game 1 of the World Series on Monday, this may trigger an override for the time corresponding to Game 2 on Wednesday. If on the WSM the user was scheduled to be working on Project D on Wednesday, but had set that an override would occur if the particular team won so that he could watch the team in Game 2, embodiments would operate in handling incoming communication events accordingly.

In some embodiments, the event selected is a stock price. A user can set a threshold of stock price of a stock for triggering an override. For example, rather than work on a project scheduled on the WSM, a user may want to be calling his/her broker for advice if a particular stock goes below $5 to determine whether to buy more or sell. In response to the event occurring, embodiments would operate in handling incoming communication events accordingly.

Figure 5:
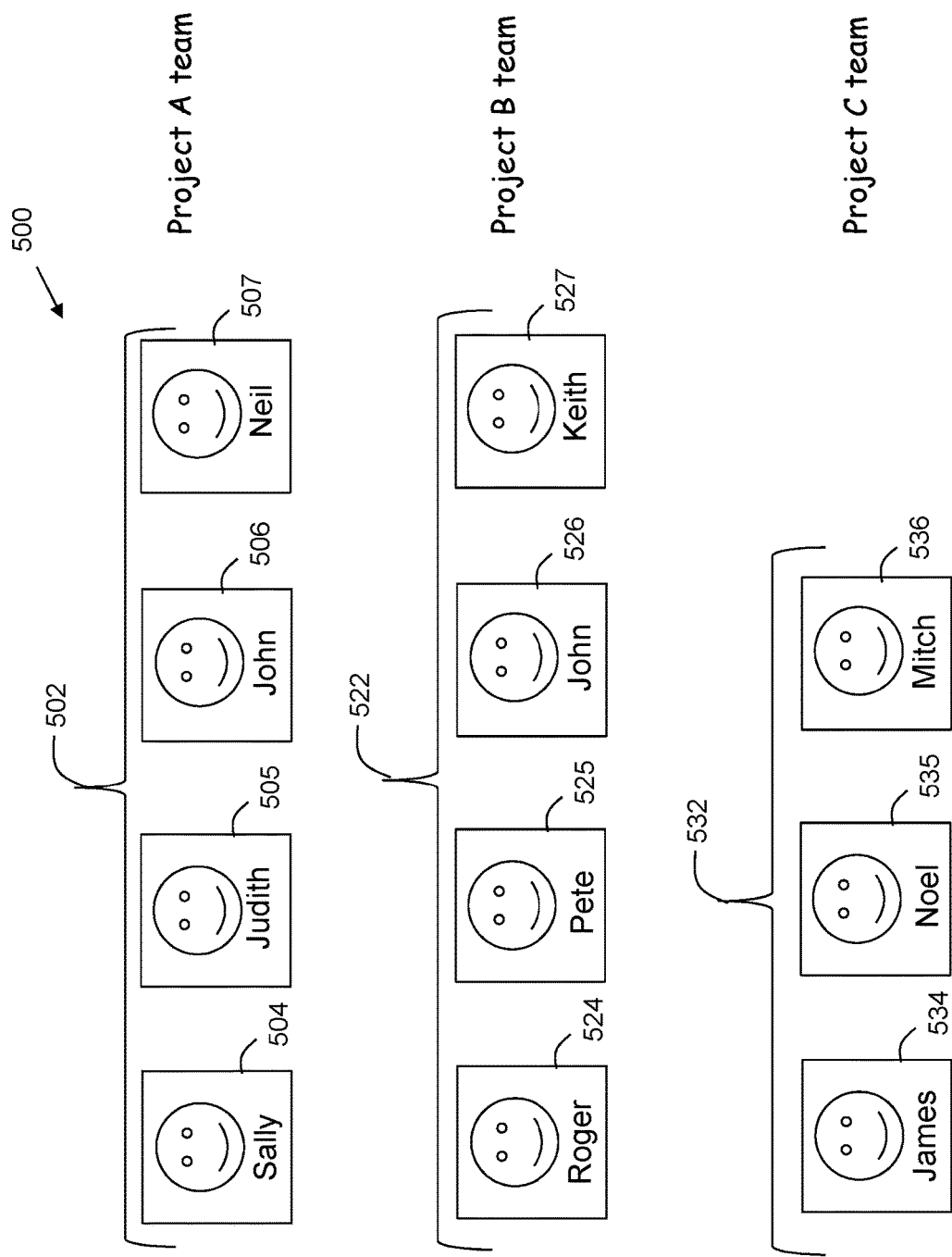
FIG. 5 indicates project teams used in examples for embodiments of the present invention.

FIG. 5 is a diagram 500 indicating project teams used in examples for embodiments of the present invention. In the example, a user "Lisa" (not shown) is a member in each of these teams (Project A, Project B, and Project C). The team members depicted in FIG. 5 show the other team members (in addition to Lisa) for each project. The team 502 involved with Project A includes Sally 504, Judith 505, John 506, and Neil 507. The team 522 involved with Project B includes Roger 524, Pete 525, John 526, and Keith 527. The team 532 involved with Project C includes James 534, Noel 535, and Mitch 536. Teams can vary in number of members. Teams may include people working on a project, people managing a project, people testing the results (such as prototypes) of a project, people marketing a project, people financing a project, etc. Teams can be formed in any suitable fashion. A list or database of the members of the teams may be included in the WSM for each respective project.

FIG. 6 shows exemplary communication events in accordance with embodiments of the present invention. A communication event can be an instant message (IM), an email message, a phone call, etc. In embodiments, one or more communication events are classified based on a plurality of task contexts. Classification of the one or more communication events can be based on one or more variables. In some embodiments, classifying each of the one or more communication events is performed based on a detected subject of each communication event. In some embodiments, classifying each of the one or more communication events is performed based on a detected sender (i.e. originator) of each communication event. In some embodiments, classifying each of the one or more communication events is performed based on keywords detected in the body of each communication event.

The one or more communication events sent to the user, intercepted by embodiments, are arbitrated based on the WSM. Arbitrating includes assigning a correlation value, based on the classification of the one or more communication events, and further based on a current task context of the user. In embodiments, the Correlation Value C can be calculated as follows in the example table:

| Variable | Value |
| --- | --- |
| Match of Task Context (either from WSM or override) and Subject of Message: | 1 |
| Sender Associated with Task Context: | 0 |

-continued

| Variable | Value |
| --- | --- |
| Match of Task Context with Message Keywords: | 1 |
| The resulting Correlation Value C from the table is: | ⅔ = 0.666 |

When the correlation value is over a predetermined threshold, embodiments deliver the message as soon as possible without delay, and when the correlation value is below the predetermined threshold, the message is deferred. Arbitration includes one or more of blocking a message, delaying a message, or allowing a message to be received by the recipient. Note that the calculation of the correlation value shown here is an example, and any suitable computation is included within embodiments of the present invention.

In the example, the threshold is 0.65. A correlation value of 0.666 is higher than the threshold value of 0.65, and therefore, the message is delivered to the recipient without any intentional delay.

Other embodiments may utilize alternative/additional algorithms and/or techniques to infer a correlation or relationship of a communication event to a particular project. In some embodiments, Discriminant Function Analysis (DFA) is utilized. In some embodiments, clustering techniques are used as part of a machine-learning process to classify communication. Bayesian filtering, convolutional neural networks, and/or other techniques may be used in some embodiments, for the purposes of classifying communication events.

In the example of FIG. 6, it is Monday at 2:00 pm as indicated at 602. Sally 504 sends instant message 604 shown in detail at 605, to Lisa. Instant message applications typically have a status indicator for each user, indicating a status such as available, busy, DND (do not disturb), in a meeting, away, and/or other possible statuses. The status indicator is typically shown in the contact list and/or other area outside of the message. Embodiments intercept and analyze message 605 by identifying keywords using natural language processing (entity detection techniques, bigram analysis, etc.). A keyword 608 "Project A," is identified. Embodiments check the WSM and determine that in column 304, row 332 (FIG. 3), at 2:00 pm on Monday, Lisa's task context is Project B. In embodiments, a correlation value, as previously described, is computed. Since the message keywords do not pertain to the current project, the computed correlation value falls below a predetermined threshold, indicating that the communication event is to be deferred. Based on the correlation value, and user preferences (see 454 of FIG. 4), embodiments present a status indicator of "Do not Disturb" 606. Thus, the instant message has a status indicator 606, showing a user communication status of "Do not Disturb," because it is determined, based on a computed correlation value, that Lisa is working on Project B while the message pertains to Project A. Accordingly, based on the computed correlation value, embodiments arbitrate the communication event (i.e. message) by deferring the delivery of the message from Sally to Lisa.

Concurrently, as Sally sends the message, Roger 524 sends an instant message 610, shown in detail at 611, to Lisa. In embodiments, a correlation value, as previously described, is computed. Since the message keywords pertain to the current project, the computed correlation value is greater than or equal to a predetermined threshold, indicating that the communication event is to be delivered with out delay. Thus, embodiments intercept the message and determine that Roger is on the team for Project B (see 524 of FIG. 5). Embodiments also determine using natural language processing that the message relates to Project B based on keyword (or key phrase) 618: "Project B." Since Roger is on the team of the project that Lisa is currently working on, and the message pertains to Project B, the status indicator 612 shows Lisa having a user communication status of AVAILABLE. Accordingly, based on the computed correlation value, embodiments arbitrate by allowing Lisa to receive the message from Roger as soon as it can be delivered.

As shown in the example, embodiments present the status differently depending on the sender/message content and the current task context of the user and user preferences. When Sally 504 tries to IM Lisa, she is presented with DND 606, and when Roger 524 concurrently tries to IM Lisa, he is presented with AVAILABLE 612. The status identifiers presented are based on a computed correlation value, which represents the relevance of a communication event (i.e. message) to the current task context of Lisa.

In some embodiments, an autoreply is sent when the status of the recipient in relation to the message (identified based on analysis) is 'do not disturb', away, or other similar status. In the example, Mitch 536 sends an email message 620, which is shown in detail at 621, to Lisa. Embodiments intercept and perform an analysis of the email message. Based on the analysis, the sender 624, subject 627, and/or keywords 622 are identified. Based on those, embodiments determine that the email message relates to Project C since such words are in the subject line at 627, in the message body as a keyword at 622, and the sender is Mitch (from the sender line at 624) who is determined to be on the team for Project C (see 536 of FIG. 5).

Since, according to the WSM, Lisa's current task context doesn't match (or isn't related to) Project C, Mitch's message is deferred, and an autoreply message is sent to Mitch 536. This is because Lisa had selected option 408 of FIG. 4 when she set her user preferences. The autoreply message could be customized by Lisa to let Mitch know that the message is deferred. In the example, the autoreply message indicates that Lisa is scheduled to work on Project C again at 10 am on Tuesday, and that the current message will be delivered at 4:00 pm today. It also includes an indication of an emergency phone number.

Figure 7:
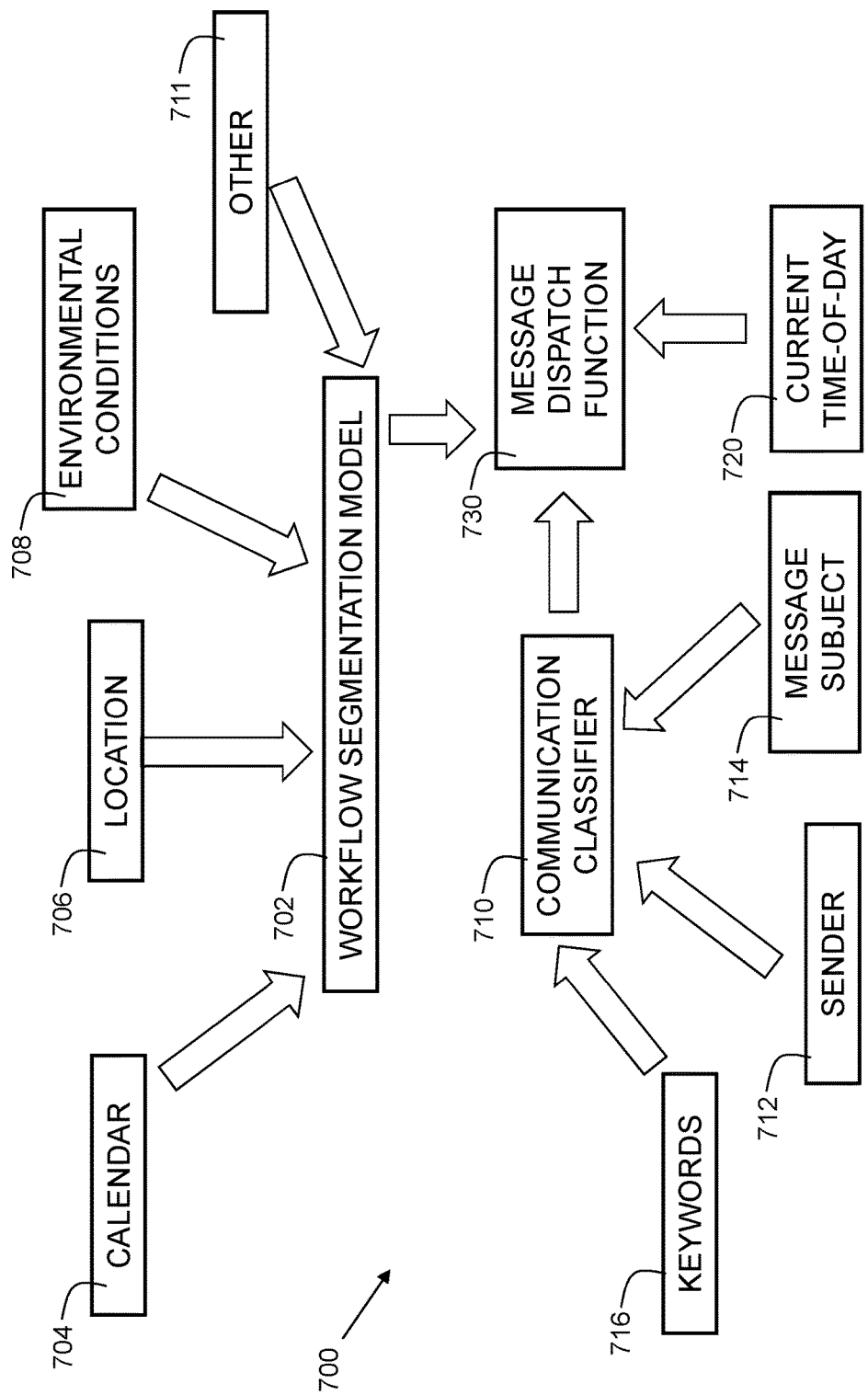
FIG. 7 shows a block diagram of elements of embodiments of the present invention.

FIG. 7 shows a block diagram 700 of elements of embodiments of the present invention. This represents an overall flow of some embodiments of the invention. The WSM 702 is derived based on calendar 704, location 706, environmental conditions 708, and/or other information 711 (such as a social media system or the like). Embodiments use natural language processing or other types of processing (such as caller ID) to analyze incoming communications. Embodiments assign a classification to the message based on sender 712, message subject 714, keywords 716, and/or other information available. The communication classifier 710 evaluates the classification (e.g., in the current example, Project A, Project B, and Project C), using the current time of day 720, and the WSM 702, to process the message dispatch function 730, which determines when to send the message (now or defer it) to the recipient.

Figure 8:
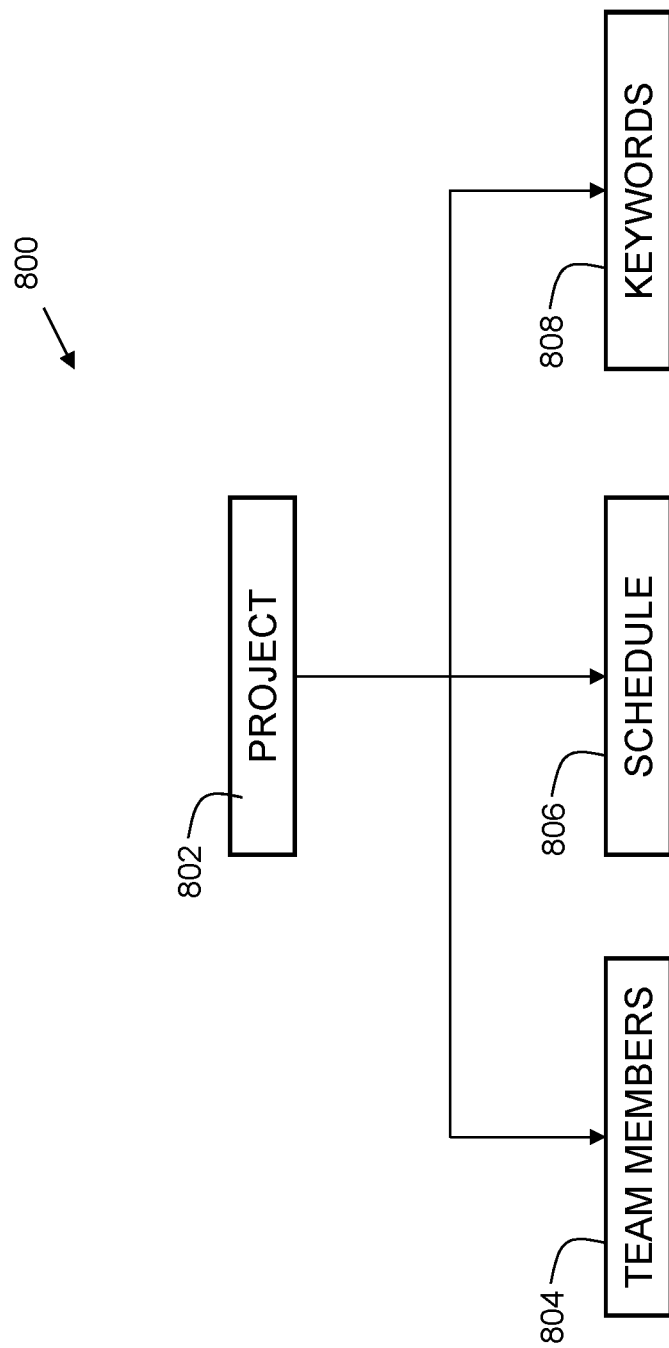
FIG. 8 shows a data structure for a project within a workflow segmentation model in accordance with embodiments of the present invention.

FIG. 8 shows a data structure 800 for a project 802 within a workflow segmentation model in accordance with embodiments of the present invention. The WSM may include, or have access to (via link, etc.) a list of team members for the project 804. The WSM may include, or have access to, a schedule 806 of the dates and times the user is working on the project. The WSM may include keywords/topics 808 pertaining to the project. For example, if the project is development of eCommerce software, example keywords could be eCommerce, cart, balance, credit, refund, item, shipping, etc.

FIG. 9 is a flowchart 900 indicating process steps for embodiments of the present invention. At 950, a WSM is determined for a user. At 952, a communication event is intercepted (i.e., received). This can be an email message, instant message, voice call, or other suitable type of communication. At 954, the received communication event is classified. It may be classified using analysis such as natural language processing and/or based on message medium (IM, email, voice, etc.). Based on the classification, and the current task context (from a WSM), a correlation value is computed. At 956, delivery is arbitrated based on the correlation value. Arbitration includes when the message is not related to the current task context, deferring (i.e., delaying or blocking the message), and in some cases, sending an autoreply, based on preset user preferences.

FIG. 10 is a flowchart 1000 indicating additional process steps for embodiments of the present invention. At 1002, a sender is checked against current task team list. At 1004, it is determined whether the sender is in the team. If yes, then at 1006, the message is delivered. If no, then at 1008, the message is analyzed. At 1010, it is determined whether the message is related to the current task. If yes, then at 1006, the message is delivered. If no, then at 1012, overrides are checked. At 1014, it is determined whether an override exists. If yes, then at 1006, the message is delivered. If no, then at 1016, the message is deferred.

Figure 11:
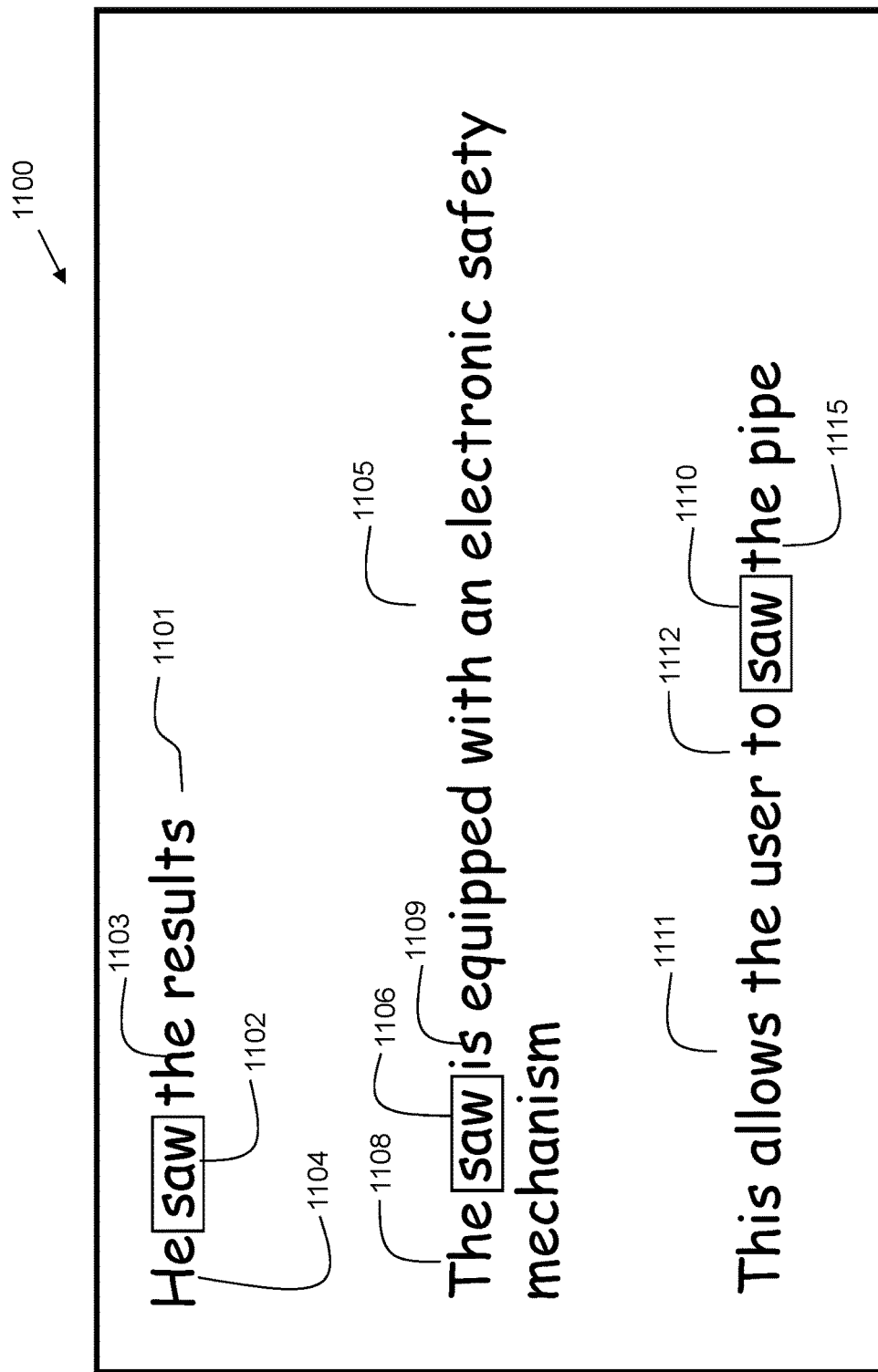
FIG. 11 shows an example of disambiguation in accordance with embodiments of the present invention.

FIG. 11 shows an example 1100 of disambiguation in accordance with embodiments of the present invention. Disambiguation is one of the processes that may be utilized for natural language processing in embodiments of the present invention. Speech-to-text, or provided text is tokenized into words and tagged with parts of speech. For some words, there can be more than one meaning and/or part of speech. FIG. 11 shows a disambiguation example with the word "saw."

In phrase 1101, the word "saw" 1102 is a past tense verb. In embodiments, a machine learning natural language analysis module may identify the prior token 1104 to the word "saw" as a pronoun, and the following token 1103 as an article. In training a classifier, the pattern of pronoun-token-article may be associated with a verb, and thus the token is interpreted as a verb.

In phrase 1105, the word "saw" 1106 is a noun for a cutting tool. In embodiments, a machine learning natural language analysis module may identify the prior token 1108 to the word saw as an article, and the following token 1109 as a verb. In training a classifier, the pattern article-token-verb may be associated with a noun, and thus the token is interpreted as a noun.

In phrase 1111, the word "saw" 1110 is a verb for cutting. In embodiments, a machine learning natural language analysis module may identify the prior token 1112 to the word "saw" as part of an infinitive form, and the following token 1115 as an article. In training a classifier, the pattern "to"-token-article may be associated with a verb, and thus the token is interpreted as a verb. These classifiers and techniques for disambiguation are examples, and other classifiers and techniques are possible. Thus, embodiments include performing a computerized natural language analysis process to classify communication events by performing a disambiguation process.

Figure 12:
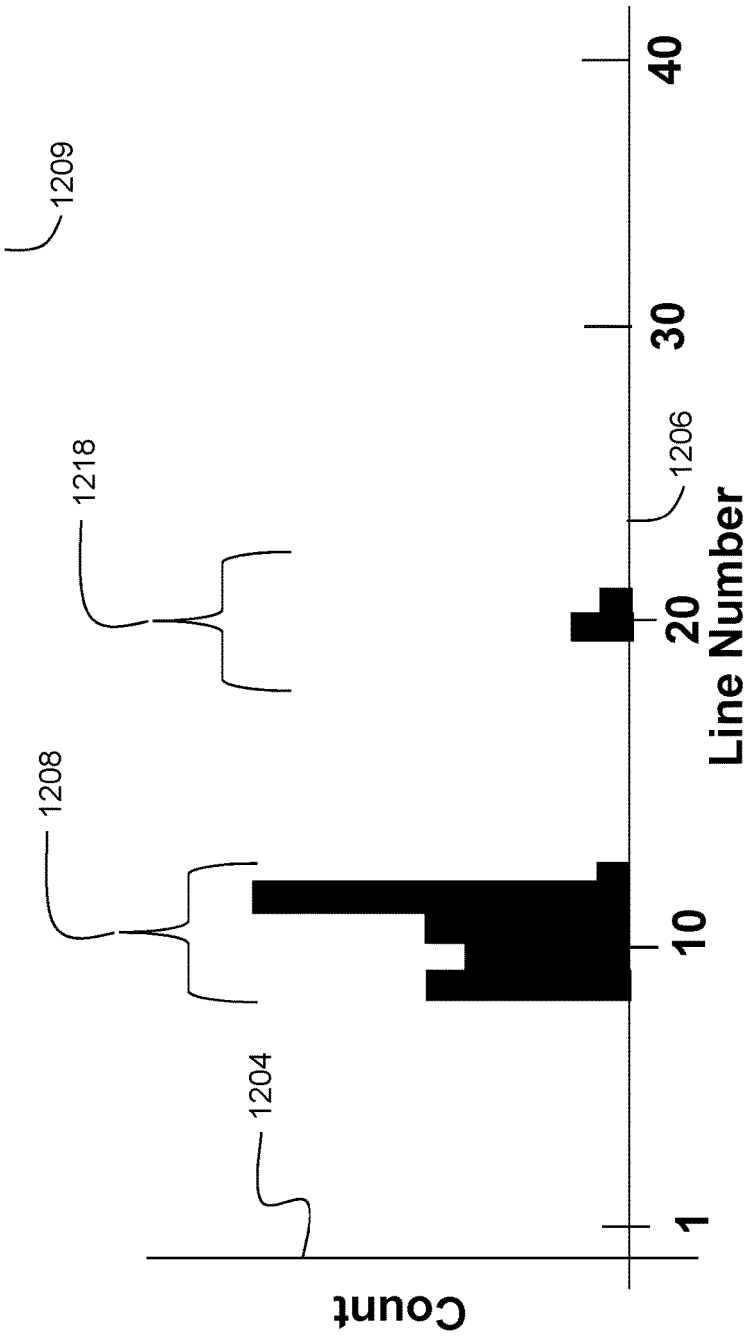
FIG. 12 shows an example of a dispersion analysis in accordance with embodiments of the present invention.

FIG. 12 shows an example 1200 of a dispersion analysis in accordance with embodiments of the present invention. In a message from Mitch, a particular word may have a non-uniform distribution in the text of the message. In the example 1200, a dispersion analysis is performed for the word (or phrase) "Project C" 1209. A graph comprises a horizontal axis 1206 representing a line number within the message, and a vertical axis 1204 representing a number of occurrences of word 1209 in the message at a given line number. As can be seen in the graph, the presence of the word 1209 is concentrated in certain line numbers, where the line numbers correspond to particular lines of text within the message. A maximum concentration 1208 is identified in the message near line number 10 of the message, and in a smaller concentration 1218 occurs near line number 20 of the message. Embodiments may include performing a computerized natural language analysis process to classify communication events by performing a dispersion analysis.

Figure 13:
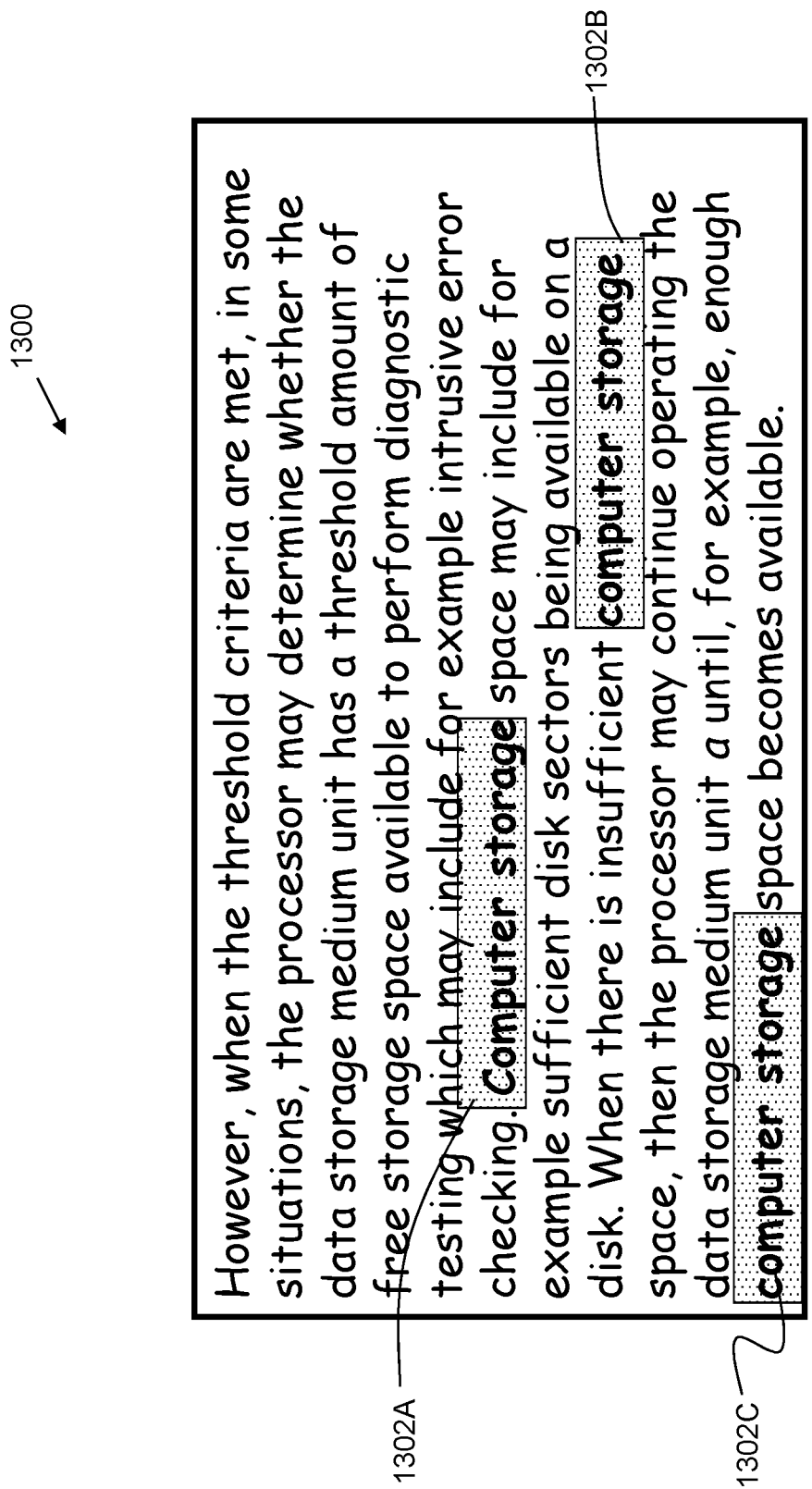
FIG. 13 shows an example of a bigram analysis in accordance with embodiments of the present invention.

FIG. 13 shows an example 1300 of a bigram analysis in accordance with embodiments of the present invention. In a bigram analysis, a pair of words in a particular order may be searched within a message. In this example, the bigram "computer storage" is searched within a text excerpt. Three occurrences, indicated as 1302A, 13028, and 1302C are present in the text passage. In embodiments, the usage of bigrams, trigrams, or more generally, n-grams (number=n), may be used to improve relevance in analyzing a message. Embodiments can include performing a computerized natural language analysis process to classify communication events by performing a bigram analysis.

As can now be appreciated, disclosed embodiments provide improvements in the technical field of electronic communication. A technical improvement in electronic communication is achieved with disclosed embodiments. Instant messages are very useful for conveying information quickly. However, they can also be quite distracting and disruptive when being received while a recipient is working on unrelated matters. Embodiments enable deferring communication that is detected to be non-essential to the current task. Furthermore, embodiments enable a user to have control over when deferred messages get delivered, conditions for when the arbitration policies are overridden, and include criteria such as message sender, message topic, and/or external factors such as environmental factors.

Disclosed embodiments provide a computer-implemented technique for filtering electronic communication based on the current task of a user. A workflow segmentation model is derived based on user-defined activities, heuristics, location data, environmental data, and/or other input data. Thus, the workflow segmentation model is significantly more than calendar information. Prior to delivery, electronic communication directed to the user is analyzed based on sender, subject, message content, time of day, and/or other criteria to determine if the message should be presented to the user immediately, or deferred, based on the relevance of the message to the current task of the user. In this way, worker productivity can be increased, as worker distractions are reduced. Thus, disclosed embodiments enable improved organizational efficiency by managing time resources, which are valuable for any organization.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. An electronic computation device comprising:
   a processor;
   a memory coupled to the processor, the memory containing instructions, that when executed by the processor, perform the process of:
   determining a workflow segmentation model for a user, wherein the workflow segmentation model includes a plurality of task contexts;
   receiving, from a sender client device, one or more communication events destined for a receiver client device associated with the user;
   performing a computerized natural language analysis process to identify keywords from each of the one or more communication events based on the plurality of task contexts; and
   arbitrating, based on the workflow segmentation model, the one or more communication events sent to the user, wherein arbitrating includes determining a correlation value, based on a number of matching criteria of the communication event in a task context table;
   determining a communication event as a mismatched communication event in response to the correlation value being below a predetermined threshold; and
   in response to identifying a mismatched communication event:
      deferring delivery of the communication event based on an induced communication delay;
      generating an auto-reply message, wherein the auto-reply message includes a future delivery time of the mismatched communication event, wherein the future delivery time is based on the induced communication delay; and
      sending the auto-reply message to the sender client device; and
      in response to data from an environmental sensor exceeding a predetermined value, overriding the induced communication delay, and delivering the mismatched communication event to the receiver client device immediately; and
      in response to data from the environmental sensor not exceeding a predetermined value, delivering the mismatched communication event to the receiver client device upon expiration of the induced communication delay.

2. The electronic computation device of claim 1, wherein the memory further comprises instructions, that when executed by the processor, perform the process of determining the workflow segmentation model is based on calendar information of the user.

3. The electronic computation device of claim 1, wherein the memory further comprises instructions, that when executed by the processor, perform the process of determining the workflow segmentation model is based on geographical location information of the user.

4. The electronic computation device of claim 1, wherein the memory further comprises instructions, that when executed by the processor, perform the process of receiving user preferences for the induced communication delay.

5. The electronic computation device of claim 1, wherein the memory further comprises instructions, that when executed by the processor, perform the process of classifying each of the one or more communication events based on a detected subject of each communication event.

6. The electronic computation device of claim 1, wherein the memory further comprises instructions, that when executed by the processor, perform the process of classifying each of the one or more communication events based on a sender of each communication event.

7. The electronic computation device of claim 1, wherein the memory further comprises instructions, that when executed by the processor, perform the process of presenting a first user communication status to a first sender based on the workflow segmentation model, and concurrently presenting a second user communication status to a second sender based on the workflow segmentation model, wherein the first user communication status is different than the second user communication status.

8. The electronic computation device of claim 7, wherein the memory further comprises instructions, that when executed by the processor, perform the process of setting the first user communication status to available, and setting the second user communication status to do-not-disturb.

9. A computer program product for an electronic computation device comprising a non-transitory computer readable storage medium having program instructions embodied therewith, the program instructions executable by a processor to cause the electronic computation device to perform the process of:
- determining a workflow segmentation model for a user, wherein the workflow segmentation model includes a plurality of task contexts;
- receiving, from a sender client device, one or more communication events destined for a receiver client device associated with the user;
- performing a computerized natural language analysis process to identify keywords from each of the one or more communication events based on the plurality of task contexts; and
- arbitrating, based on the workflow segmentation model, the one or more communication events sent to the user, wherein arbitrating includes determining a correlation value, based on a number of matching criteria of the communication event in a task context table;
- determining a communication event as a mismatched communication event in response to the correlation value being below a predetermined threshold; and
- in response to identifying a mismatched communication event:
  - deferring delivery of the communication event based on an induced communication delay;
  - generating an auto-reply message, wherein the auto-reply message includes a future delivery time of the mismatched communication event, wherein the future delivery time is based on the induced communication delay; and
  - sending the auto-reply message to the sender client device; and
- in response to data from an environmental sensor exceeding a predetermined value, overriding the induced communication delay, and delivering the mismatched communication event to the receiver client device immediately; and
- in response to data from the environmental sensor not exceeding a predetermined value, delivering the mismatched communication event to the receiver client device upon expiration of the induced communication delay.

10. The computer program product of claim 9, wherein the computer readable storage medium includes program instructions executable by the processor to cause the electronic computation device to determine the workflow segmentation model based on geographical location information of the user.

11. The computer program product of claim 9, wherein the computer readable storage medium includes program instructions executable by the processor to cause the electronic computation device to perform the process of presenting a first user communication status to a first sender based on the workflow segmentation model, and concurrently presenting a second user communication status to a second sender based on the workflow segmentation model, wherein the first user communication status is different than the second user communication status.

12. The computer program product of claim 11, wherein the computer readable storage medium includes program instructions executable by the processor to cause the electronic computation device to set the first user communication status to available, and set the second user communication status to do-not-disturb.

* * * * *